United States Patent

[11] 3,625,553

| [72] | Inventor | Luciano Mattioli<br>Brunoy, France |
|---|---|---|
| [21] | Appl. No. | 51,108 |
| [22] | Filed | June 30, 1970 |
| [45] | Patented | Dec. 7, 1971 |
| [73] | Assignee | D.F.A.S. a.r.l. Diffusion Fabrications<br>Automobiles<br>Paris, France |
| [32] | Priority | July 3, 1969 |
| [33] | | France |
| [31] | | 6922471 |

[54] DEVICES FOR PIVOTALLY CONNECTING MEMBERS
2 Claims, 1 Drawing Fig.

[52] U.S. Cl. .................................................. 287/21,
287/87, 248/181
[51] Int. Cl. .................................................. F16c 11/06
[50] Field of Search .......................................... 287/12, 21,
87; 248/181, 481, 288, 483, 484

[56] References Cited
UNITED STATES PATENTS

| 86,173 | 1/1869 | Maynard | 287/12 X |
|---|---|---|---|
| 1,533,281 | 4/1925 | Tautz | 287/87 UX |
| 3,409,317 | 11/1968 | Richards | 287/21 |

FOREIGN PATENTS

| 291,547 | 6/1928 | Great Britain | 287/12 |
|---|---|---|---|
| 68,417 | 1/1949 | Denmark | 287/87 |

Primary Examiner—Andrew V. Kundrat
Attorneys—Robert E. Burns and Emmanuel J. Lobato ABSTRACT: A device for interconnecting a first member carrying a rearview mirror and a second member, for example, the wing of a vehicle, comprises a ball and socket connection and resilient means for urging the ball against a surface of the socket for resisting relative movement between the ball and the socket.

PATENTED DEC 7 1971 3,625,553
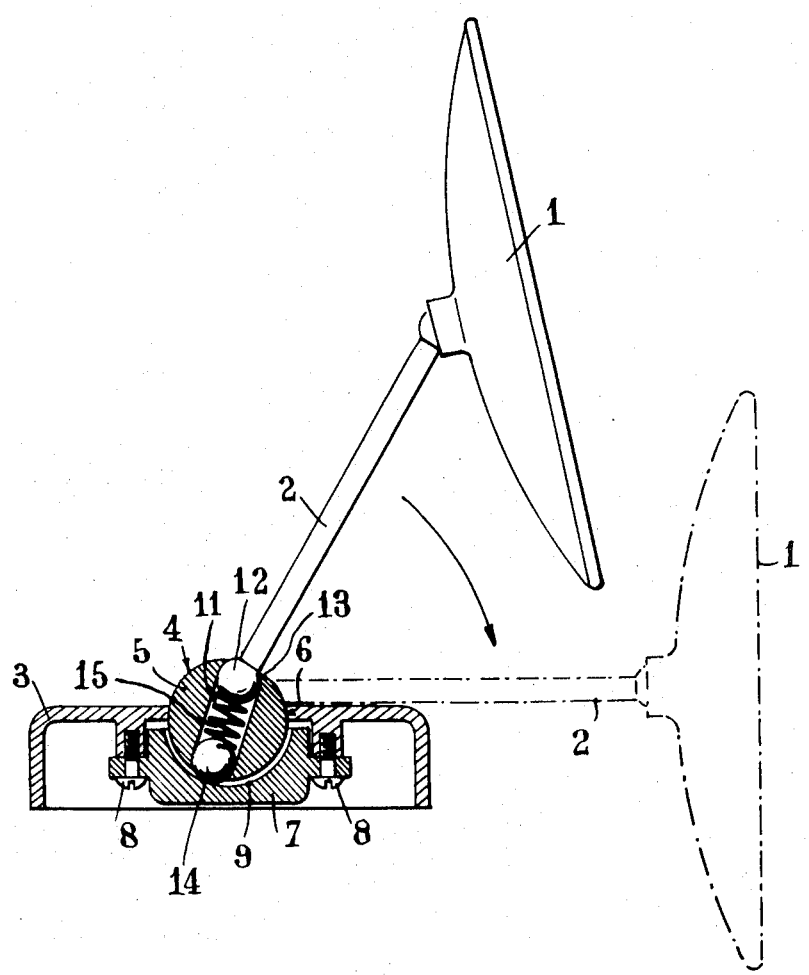

3,625,553

DEVICES FOR PIVOTALLY CONNECTING MEMBERS

BACKGROUND OF THE INVENTION

The present invention relates to devices for pivotally connecting two members together and, in particular to devices for pivotally mounting a rearview mirror on the wing of a vehicle.

It is known that for reasons of safety, rearview mirrors which are mounted on the wings of motor vehicles, must be capable of giving way when subject to sudden impact forces. The rearview mirrors are folded back into a horizontal position, in order to limit any injuries which may be caused to a person.

Various articulating devices are known, which enable a wing rearview mirror to give way when subject to impact forces. However, the known devices have the disadvantage of a relatively complicated structure and do not enable an easy orientation of the rearview mirror in every direction.

AIMS OF THE INVENTION

An object of the present invention is to provide a device which overcomes this disadvantage with a particularly simple design and which enables a rearview mirror to be folded back in a horizontal position, whatever its previously set position.

According to the present invention, a device for interconnecting a first member and a second member so as to permit relative universal movement between said members, comprises a ball connected to the first member and retained for movement within a socket connected to the second member, and resilient means for urging the ball against a surface of the socket for resisting relative movement between the ball and the socket.

Preferably, the socket is in the form of a substantially spherical roller member having a diametrical through bore containing the ball, the resilient means and a second ball, the resilient means being arranged between the balls and urging the second ball against a substantially hemispherical surface of a housing formed in the second member in which the roller member is movably retained. Preferably, the housing of the roller member includes a base part having a through aperture formed therein and a support part connected to the base part and having a substantially hemispherical surface in alignment with the aperture of the base part.

The articulating device according to a preferred embodiment enables the first member in the form of an arm, bearing a rearview mirror, for example, to be oriented in any direction whatever and able to be automatically knocked into the horizontal position in case of impact, thus offering an assurance of safety. Furthermore, the device enables the arm to be held in a predetermined position, no matter what vibrations or jarring the base part is subjected to, by choosing, in a suitable manner, the value of the tension of the compression spring in the interior of the roller member.

DESCRIPTION OF DRAWING

An embodiment of the present invention will now be described, by way of example, reference being made to the FIGURE of the accompanying drawing which is a sectional view of an articulating device of a wing rearview mirror arm.

DESCRIPTION OF A PREFERRED EMBODIMENT

As shown, a rearview mirror 1 is pivotally connected to the upper end of a first member in the form of an arm 2. At the opposite lower end of the arm 2, there is provided a ball 12 arranged for universal movement in a diametrical through bore 11 of a socket in the form of a substantially spherical roller or larger ball member 5. A steel ball 14 is also arranged in the bore 11 and the balls 14 and 12 have between them a spring 15. The diameter of ball 12 is substantially equal to the diameter of bore 11 but larger than the diameter of the open end of the bore 11 from which the arm 2 extends.

The roller member 5 is retained in a support housing fixed to a second member, i.e. the wind (not shown) of a vehicle; the housing includes a base part 3 and a support part 7. The base part 3 and support part 7 are connected together by bolts 8. The base part 3 has a through aperture 6 of circular cross section for maintaining the roller member 5 in the housing. The support part 7 has a substantially hemispherical surface 9 in alignment with the aperture 6 which is substantially concentric with the outer surface of the roller member 5.

The spring 15 urges the ball 12 against the surface of the bore 11 adjacent the end 13 so that relative movement between the ball 12 and the roller member 5 is resisted. The spring 15 also urges the ball 14 against surface 9 so that relative movement between the roller ember 5 and the housing is resisted since the roller member 5 will be urged against the sides of aperture 6. This resistance is sufficient to enable the arm 2 to maintain a chosen position under normal operational circumstances, for example, when the vehicle is being driven along a road. However, should the arm 2 be subject to an impact force, for example, during an accident, then the resistance is overcome and the arm will be moved to the position shown in dotted lines.

By selecting a spring 15 having a predetermined tension, a predetermined resistance to movement can be obtained.

What is claimed is:

1. A device for interconnecting a first member and a second member so as to permit relative universal movement between said members, comprising, a ball connected to the first member, a socket member connected to the second member, the ball being movably retained within said socket members and resilient means engaging the ball for urging the ball against a surface of the socket member for resisting relative movement between the ball and the socket members, said socket member being in the form of a substantially spherical larger ball member having a diametrical through bore containing the ball, the resilient means and a second ball, the resilient means being arranged between said ball and second ball and urging the second ball against a substantially hemispherical surface of a support housing formed by the second member and in which the larger ball member is movably retained.

2. A device as claimed in claim 1, wherein said support housing of the larger ball member includes a base part having a through aperture formed therein and a support part connected to the base part and which support part has said substantially hemispherical surface in alignment with the aperture of the base part.

* * * * *